United States Patent
Dong et al.

(10) Patent No.: US 11,171,722 B2
(45) Date of Patent: Nov. 9, 2021

(54) OPTICAL SIGNAL TRANSCEIVER APPARATUS

(71) Applicant: HUAWEI TECHNOLOGIES CO., LTD., Guangdong (CN)

(72) Inventors: Zhenhua Dong, Shenzhen (CN); Chao Pan, Dongguan (CN); Zhiyong Feng, Dongguan (CN); Xu Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/097,519

(22) Filed: Nov. 13, 2020

(65) Prior Publication Data

US 2021/0067244 A1    Mar. 4, 2021

Related U.S. Application Data

(63) Continuation of application No. PCT/CN2019/074843, filed on Feb. 21, 2019.

(30) Foreign Application Priority Data

May 14, 2018    (CN) .......................... 201810458447.1

(51) Int. Cl.
| | |
|---|---|
| *H04B 10/071* | (2013.01) |
| *H04B 10/40* | (2013.01) |
| *H04B 10/61* | (2013.01) |
| *H04B 10/25* | (2013.01) |

(52) U.S. Cl.
CPC .......... *H04B 10/071* (2013.01); *H04B 10/25* (2013.01); *H04B 10/40* (2013.01); *H04B 10/61* (2013.01)

(58) Field of Classification Search
CPC ...... H04B 10/071; H04B 10/25; H04B 10/40; H04B 10/61

(Continued)

(56) References Cited

U.S. PATENT DOCUMENTS 9,960,845 B2 *  5/2018  Ngo ...................... H04L 5/0008
10,211,920 B1 *  2/2019  Khaleghi ........... H04B 10/0793
(Continued)

FOREIGN PATENT DOCUMENTS

CN    101753252 A    6/2010
CN    102142892 A    8/2011
(Continued)

OTHER PUBLICATIONS

Office Action issued in Chinese Application No. 201810458447.1 dated May 19, 2020, 20 pages (with English translation).

(Continued)

*Primary Examiner* — Dalzid E Singh
(74) *Attorney, Agent, or Firm* — Fish & Richardson P.C.

(57) ABSTRACT

This application discloses an optical signal transceiver apparatus, and belongs to the communications field. The apparatus includes: an optical signal generation module, configured to generate a to-be-sent optical signal and a local oscillator optical signal, where the to-be-sent optical signal includes an OTDR signal; an optical combining/splitting module, configured to: receive a to-be-processed optical signal from an optical fiber; and input the to-be-processed optical signal into an coherent receiving module; the coherent receiving module, configured to coherently receive the local oscillator optical signal and the to-be-processed optical signal to obtain a to-be-processed electrical signal; a signal processing module, configured to: obtain a first digital signal and a second digital signal from the to-be-processed electrical signal based on a signal frequency; process the first digital signal to obtain a communications code stream; and process the second digital signal to obtain information used to reflect a feature of the optical fiber.

14 Claims, 9 Drawing Sheets

(58) Field of Classification Search
USPC .......................................................... 398/16
See application file for complete search history.

(56) References Cited

U.S. PATENT DOCUMENTS

| | | | | |
|---|---|---|---|---|
| 2012/0237202 | A1* | 9/2012 | Abe | H04B 10/616 |
| | | | | 398/16 |
| 2013/0083813 | A1 | 4/2013 | Hartog | |
| 2014/0072306 | A1* | 3/2014 | Sridhar | H04J 14/0275 |
| | | | | 398/79 |
| 2015/0171958 | A1* | 6/2015 | Webb | H04B 10/071 |
| | | | | 398/37 |
| 2017/0142504 | A1 | 5/2017 | Hochberg et al. | |
| 2018/0123687 | A1 | 5/2018 | Chang et al. | |

FOREIGN PATENT DOCUMENTS

| | | | | |
|---|---|---|---|---|
| CN | 102170307 | A | 8/2011 | |
| CN | 102761364 | A | 10/2012 | |
| CN | 103743551 | A | 4/2014 | |
| CN | 104697557 | A | 6/2015 | |
| CN | 107408982 | A | 11/2017 | |
| CN | 107483106 | A | 12/2017 | |
| WO | WO-0247293 | A1 * | 6/2002 | ........... H04B 10/071 |
| WO | 2017177412 | A1 | 10/2017 | |

OTHER PUBLICATIONS

PCT International Search Report and Written Opinion issued in International Application No. PCT/CN2019/074843 dated Apr. 15, 2019, 17 pages (with English translation).

Yan et al., "Coherent O-OTDR based on polarization-diversity integrated coherent receiver and heterodyne detection," IEEE 2017 25th Optical Fiber Sensors Conference (OFS), Jun. 2017, 4 pages.

Extended European Search Report issued in European Application No. 19804169.1 dated May 20, 2021, 12 pages.

Izumita et al., "Fading Noise Reduction in Coherent OTDR," IEEE Photonics Technology Letters, vol. 4, No. 2, Feb. 1992, 3 pages.

* cited by examiner

OPTICAL SIGNAL TRANSCEIVER APPARATUS

CROSS-REFERENCE TO RELATED APPLICATIONS

This application is a continuation of International Application No. PCT/CN2019/074843, filed on Feb. 12, 2019, which claims priority to Chinese Patent Application No. 201810458447.1, filed on May 14, 2018. The disclosures of the aforementioned applications are hereby incorporated by reference in their entireties.

TECHNICAL FIELD

This application relates to the communications field, and especially, to an optical signal transceiver apparatus.

BACKGROUND

An optical signal transceiver apparatus may be a device or a part of the device in an optical network. The optical signal transceiver apparatus may send an optical supervisory channel (OSC) signal and an optical time domain reflectometer (OTDR) signal to a peer device on an optical fiber, receive an OSC signal that is sent by the peer device and an OTDR signal obtained by the optical fiber by reflecting and scattering the sent OTDR, and process the received OSC signal and the received OTDR signal.

Currently, the optical signal transceiver apparatus includes an OSC signal generator, an OTDR signal generator, a laser, an optical splitter, a first photoelectric detector, a second photoelectric detector, a multiplexer/demultiplexer, an OTDR processing unit, and an OSC processing unit. The OSC signal generator and the OTDR signal generator are respectively connected to a first input end and a second input end of the laser, and an output end of the laser is connected to a first end of the optical splitter. A second end of the optical splitter is connected to an input end of the first photoelectric detector, and a third end of the optical splitter is connected to a first end of the multiplexer/demultiplexer. A second end of the multiplexer/demultiplexer is connected to an input end of the second photoelectric detector, and a third end of the multiplexer/demultiplexer is connected to the optical fiber. An output end of the first photoelectric detector is connected to the OTDR processing unit. An output end of the second photoelectric detector is connected to the OSC processing unit.

Under the control of the OSC signal generator and the OTDR signal generator, the laser generates a first OSC signal or a first OTDR signal, transmits the first OSC signal or the first OTDR signal to the optical fiber by using the optical splitter and the multiplexer/demultiplexer, and continues to transmit the first OSC signal or the first OTDR signal to the peer device by using the optical fiber. The multiplexer/demultiplexer may receive a second OSC signal that is sent by the peer device and an second OTDR signal that is sent by the peer device and that is obtained by the optical fiber by reflecting and scattering the first OTDR signal, send the second OSC signal to the second photoelectric detector, and send the second OTDR signal to the first photoelectric detector by using the optical splitter. The first photoelectric detector receives the second OTDR signal and forwards the second OTDR signal to the OTDR processing unit. The second photoelectric detector receives the second OSC signal and forwards the second OSC signal to the OSC processing unit. The OTDR processing unit processes the second OTDR signal to obtain information used to reflect a feature of the optical fiber. The OSC processing unit processes the second OSC signal to obtain a communications code stream of the peer device.

In a process of implementing this application, the inventor finds that the prior art has at least the following problem:

Currently, the optical signal transceiver apparatus receives an OTDR signal by using a photoelectric detector. Because receiving sensitivity of the photoelectric detector is relatively low, a dynamic range of OTDR signal detection is affected.

SUMMARY

To expand a dynamic range of OTDR signal detection, embodiments of this application provide an optical signal transceiver apparatus. The technical solutions are as follows:

According to a first aspect, an embodiment of this application provides an optical signal transceiver apparatus. The apparatus includes an optical signal generation module, an optical combining/splitting module, a coherent receiving module, and a signal processing module. The optical signal generation module is configured to: generate a to-be-sent optical signal and a local oscillator optical signal, where the to-be-sent optical signal includes a first optical time domain reflectometer OTDR signal; input the local oscillator optical signal into the coherent receiving module; and input the to-be-sent optical signal into an optical fiber by using the optical combining/splitting module. The optical combining/splitting module is configured to: receive a to-be-processed optical signal from the optical fiber, where the to-be-processed optical signal includes a first OSC signal and a second OTDR signal that is obtained by the optical fiber by reflecting and scattering the first OTDR signal, a frequency of the first OSC signal is different from a frequency of the second OTDR signal, and a difference between the frequency of the first OSC signal and the frequency of the second OTDR signal is less than a processing bandwidth of the coherent receiving module; and input the to-be-processed optical signal into the coherent receiving module. The coherent receiving module is configured to: coherently receive the local oscillator optical signal and the to-be-processed optical signal to obtain a to-be-processed electrical signal; and send the to-be-processed electrical signal to the signal processing module. The signal processing module is configured to: obtain, from the to-be-processed electrical signal based on a signal frequency, a first digital signal corresponding to the first OSC signal and a second digital signal corresponding to the second OTDR signal; process the first digital signal to obtain a communications code stream; and process the second digital signal to obtain information used to reflect a feature of the optical fiber.

DESCRIPTION OF EMBODIMENTS

The following further describes in detail the embodiments of this application with reference to accompanying drawings.

An optical signal transceiver apparatus provided in this application may be applied to an optical communications network, and the apparatus may be a communications device in the optical communications network or a card installed on the communications device. For example, an optical communications network shown in FIG. 1 includes communications devices such as a first device and a second device, and the first device and the second device are connected by using an optical fiber. The apparatus may be the first device or a card in the first device, and the first device may receive an optical signal sent by the second device or send an optical signal to the second device by using the apparatus; and/or the apparatus may be the second device or a card in the second device, and the second device may receive an optical signal sent by the first device or send an optical signal to the first device by using the apparatus. For a structure of the apparatus, refer to content in any one of the following embodiments.

An embodiment of this application provides an optical signal transceiver apparatus, and the optical signal transceiver apparatus may be a physical device or a card in the physical device. For example, referring to FIG. 1, the first device and the second device that are connected to the optical fiber in the optical communications network each may include an optical signal transceiver apparatus.

Figure 1:
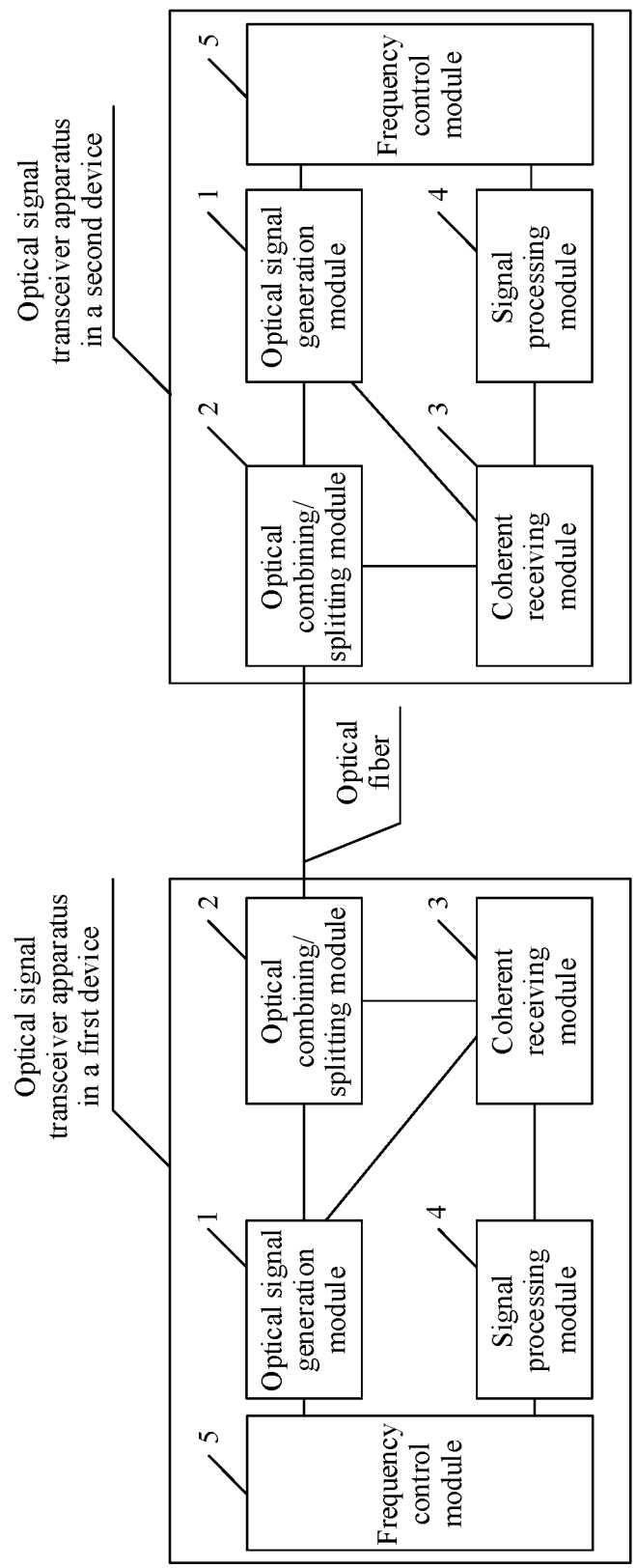
FIG. 1 is a schematic structural diagram of an optical signal transceiver apparatus according to an embodiment of this application.

A structure of the optical signal transceiver apparatus in the first device is the same as a structure of the optical signal transceiver apparatus in the second device. The optical signal transceiver apparatus in the first device is used as an example below for detailed description. Referring to FIG. 1, the optical signal transceiver apparatus in the first device may include:

an optical signal generation module 1, an optical combining/splitting module 2, a coherent receiving module 3, and a signal processing module 4.

A first output end of the optical signal generation module 1 is connected to a first end of the optical combining/splitting module 2, and a second output end of the optical signal generation module 1 is connected to a first input end of the coherent receiving module 3. A second end of the optical combining/splitting module 2 is connected to a second input end of the coherent receiving module 3, and a third end of the optical combining/splitting module 2 is connected to the optical fiber. An output end of the coherent receiving module 3 is connected to an input end of the signal processing module 4.

The optical signal generation module 1 is configured to: generate a to-be-sent optical signal and a local oscillator optical signal, where the to-be-sent optical signal includes a first OTDR signal; input the local oscillator optical signal into the coherent receiving module 3; and input the to-be-sent optical signal into the optical fiber by using the optical combining/splitting module 2.

The optical combining/splitting module 2 is configured to: receive a to-be-processed optical signal from the optical fiber, where the to-be-processed optical signal includes a first OSC signal and a second OTDR signal that is obtained by the optical fiber by reflecting and scattering the first OTDR signal, a frequency of the first OSC signal is different from a frequency of the second OTDR signal, and a difference between the frequency of the first OSC signal and the frequency of the second OTDR signal is less than a processing bandwidth of the coherent receiving module 3; and input the to-be-processed optical signal into the coherent receiving module 3.

The coherent receiving module 3 is configured to: coherently receive the local oscillator optical signal and the to-be-processed optical signal to obtain a to-be-processed electrical signal; and send the to-be-processed electrical signal to the signal processing module 4.

The signal processing module 4 is configured to: obtain, from the to-be-processed electrical signal based on a signal frequency, a first digital signal corresponding to the first OSC signal and a second digital signal corresponding to the second OTDR signal; process the first digital signal to obtain a communications code stream; and process the second digital signal to obtain information used to reflect a feature of the optical fiber.

Optionally, the processing bandwidth of the coherent receiving module 3 is a bandwidth of a signal that can be processed by the coherent receiving module 3.

Optionally, the to-be-sent optical signal generated by the optical signal generation module 1 may further include a second OSC signal. The optical signal generation module 1 may generate the first OTDR signal and the second OSC signal at the same time, or may generate the first OTDR signal and the second OSC signal at different times. In other words, the to-be-sent optical signal currently generated by the optical signal generation module 1 may include the first OTDR signal, or the second OSC signal, or both the first OTDR signal and the second OSC signal.

When the to-be-sent optical signal includes the second OSC signal, the optical combining/splitting module 2 inputs the second OSC signal into the optical fiber, and the second OSC signal is transmitted to the second device on the optical fiber. When the to-be-sent optical signal includes the first OTDR signal, the optical combining/splitting module 2 inputs the first OTDR signal into the optical fiber and transmits the first OTDR signal on the optical fiber. In a process of transmitting the first OTDR signal on the optical fiber, the optical fiber reflects or scatters the first OTDR signal to obtain the second OTDR signal, and the second OTDR signal is transmitted back to the optical combining/splitting module 2 in the first device on the optical fiber.

The optical signal transceiver apparatus in the second device also sends the first OSC signal on the optical fiber, and the first OSC signal is transmitted to the optical combining/splitting module 2 in the first device on the optical fiber. Therefore, the to-be-processed optical signal received by the optical combining/splitting module 2 on the optical fiber includes the first OSC signal and the second OTDR signal.

Because the to-be-processed optical signal includes the first OSC signal and the second OTDR signal, the to-be-processed electrical signal that is input by the coherent receiving module 3 into the signal processing module 4 includes an electrical signal corresponding to the first OSC signal and an electrical signal corresponding to the second OTDR signal, and the signal processing module 4 may perform analog-to-digital conversion on the to-be-processed electrical signal, so that the converted to-be-processed electrical signal includes the first digital signal corresponding to the first OSC signal and the second digital signal corresponding to the second OTDR signal.

This embodiment of this application achieves at least the following technical effects: The coherent receiving module 3 coherently receives the to-be-processed optical signal, and coherent receiving processing sensitivity of the coherent receiving module 3 is relatively high, so that a dynamic range of OTDR signal detection can be expanded. In addition, the optical signal generation module 1 directly inputs the local oscillator optical signal into the coherent receiving module 3, so that a component configured to generate a local oscillator optical signal does not need to be independently disposed for the coherent receiving module 3. This reduces a quantity of components and reduces costs. Moreover, because the frequency of the first OSC signal is different from the frequency of the second OTDR signal, the optical signal transceiver apparatus may coherently receive the to-be-processed optical signal and the local oscillator optical signal by using one coherent receiving module 3, to obtain the to-be-processed electrical signal, and then the signal processing module 4 obtains, from the to-be-processed electrical signal based on the signal frequency, the first digital signal corresponding to the first OSC signal and the second digital signal corresponding to the second OTDR signal, so that a quantity of coherent receiving modules 3 included in the optical signal transceiver apparatus can be reduced, and costs are further reduced.

Optionally, the coherent receiving module 3 may be a component for implementing an optical coherent receiving function, and the component may be an integrated coherent receiver (ICR), a simple coherent receiver including an optical combiner and a photoelectric detector, or the like. The optical combining/splitting module 2 may be an optical coupler, an optical circulator, or the like.

Optionally, the first device and the second device may work in a master-slave mode. The first device may be a master device and the second device is a slave device, or the first device is a slave device and the second device is a master device.

Optionally, the optical signal generation module 1 is implemented in a plurality of manners. In this embodiment of this application, first to fifth implementations are listed below. Other implementations are not listed one by one in this embodiment of this application.

Figure 2:
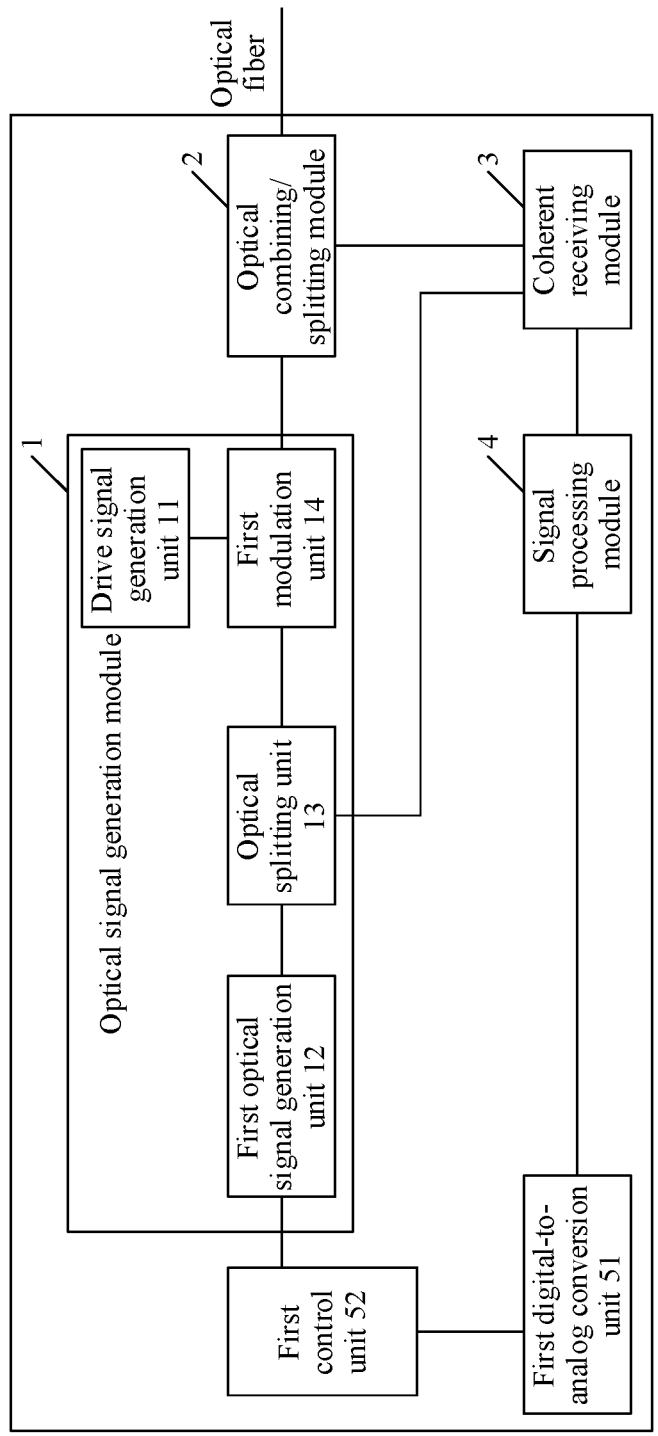
FIG. 2 is a schematic structural diagram of another optical signal transceiver apparatus according to an embodiment of this application.

In the first implementation, referring to FIG. 2, the optical signal generation module 1 may include:

a drive signal generation unit 11, a first optical signal generation unit 12, an optical splitting unit 13, and a first modulation unit 14.

An output end of the first optical signal generation unit 12 is connected to an input end of the optical splitting unit 13. A first output end of the optical splitting unit 13 is connected to a first input end of the first modulation unit 14, and a second output end of the optical splitting unit 13 is connected to the first input end of the coherent receiving module 3. A second input end of the first modulation unit 14 is connected to an output end of the drive signal generation unit 11, and an output end of the first modulation unit 14 is connected to the first end of the optical combining/splitting module 2.

The drive signal generation unit 11 is configured to: generate a drive signal corresponding to the to-be-sent optical signal; and input the drive signal into the first modulation unit 14.

The first optical signal generation unit 12 is configured to: generate an optical signal; and input the optical signal into the optical splitting unit 13.

The optical splitting unit 13 is configured to: split the optical signal into a first-channel optical signal and a second-channel optical signal; input the first-channel optical signal into the coherent receiving module 3; and input the second-channel optical signal into the first modulation unit 14.

The first modulation unit 14 is configured to modulate the second-channel optical signal into the to-be-sent optical signal based on the drive signal.

Optionally, the optical signal generated by the first optical signal generation unit 12 may be a direct-current optical signal, and the direct-current optical signal is a continuous-type optical signal. Therefore, the first-channel optical signal and the second-channel optical signal that are obtained by the optical splitting unit 13 through splitting each may be a direct-current optical signal, and the first-channel optical signal is used as the local oscillator optical signal and input into the coherent receiving module 3.

Optionally, the drive signal generated by the drive signal generation unit 11 may include a first drive signal or a second drive signal. The first drive signal may include an OTDR drive signal and the second drive signal may include an OSC drive signal, or the first drive signal may include an OSC drive signal and the second drive signal may include an OTDR drive signal.

Meanings of the first drive signal and the second drive signal in other implementations of this application are the same as the meanings of the first drive signal and the second drive signal in the first implementation, and therefore are not described in detail again in the other implementations.

When the drive signal generation unit 11 inputs the first drive signal into the first modulation unit 14, the first modulation unit 14 modulates the second-channel optical signal into a first signal based on the first drive signal, and inputs the first signal into the optical fiber by using the optical combining/splitting module 2. When the drive signal generation unit 11 inputs the second drive signal into the first modulation unit 14, the first modulation unit 14 modulates the second-channel optical signal into a second signal based on the second drive signal, and inputs the second signal into the optical fiber by using the optical combining/splitting module 2.

The first signal may include the first OTDR signal and the second signal may include the second OSC signal, or the first signal may include the second OSC signal and the second signal may include the first OTDR signal.

Meanings of the first signal and the second signal in other implementations of this application are the same as the meanings of the first signal and the second signal in the first implementation, and therefore are not described in detail again in the other implementations.

Optionally, when the drive signal generation unit 11 inputs an OTDR drive signal into the first modulation unit 14, the first modulation unit 14 modulates the second-channel optical signal into the first OTDR signal based on the OTDR drive signal. When the drive signal generation unit 11 inputs an OSC drive signal into the first modulation unit 14, the first modulation unit 14 modulates the second-channel optical signal to the second OSC signal based on the OSC drive signal.

Optionally, the first optical signal generation unit 12 may be a distributed feedback (DFB) laser, an external cavity laser (ECL), a distributed Bragg reflector (DBR) laser, or the like. The optical splitting unit 13 may be an optical coupler or the like. The first modulation unit 14 may be a semiconductor optical amplifier (SOA), an electro-absorption modulator (EAM), a Mach-Zehnder modulator (MZM), or the like. The optical combining/splitting module 2 may be an optical coupler, an optical circulator, or the like.

The first implementation achieves at least the following technical effects: The optical splitting unit 13 splits the optical signal that is input by the first optical signal generation unit 12 into the first-channel optical signal and the second-channel optical signal, and inputs the first-channel optical signal into the coherent receiving module 3 as the local oscillator optical signal, and the first modulation unit 14 converts the second-channel optical signal into the to-be-sent first signal or the to-be-sent first signal second signal. Therefore, only one optical signal generation unit is required. This reduces a quantity of components and reduces costs.

Figure 3:
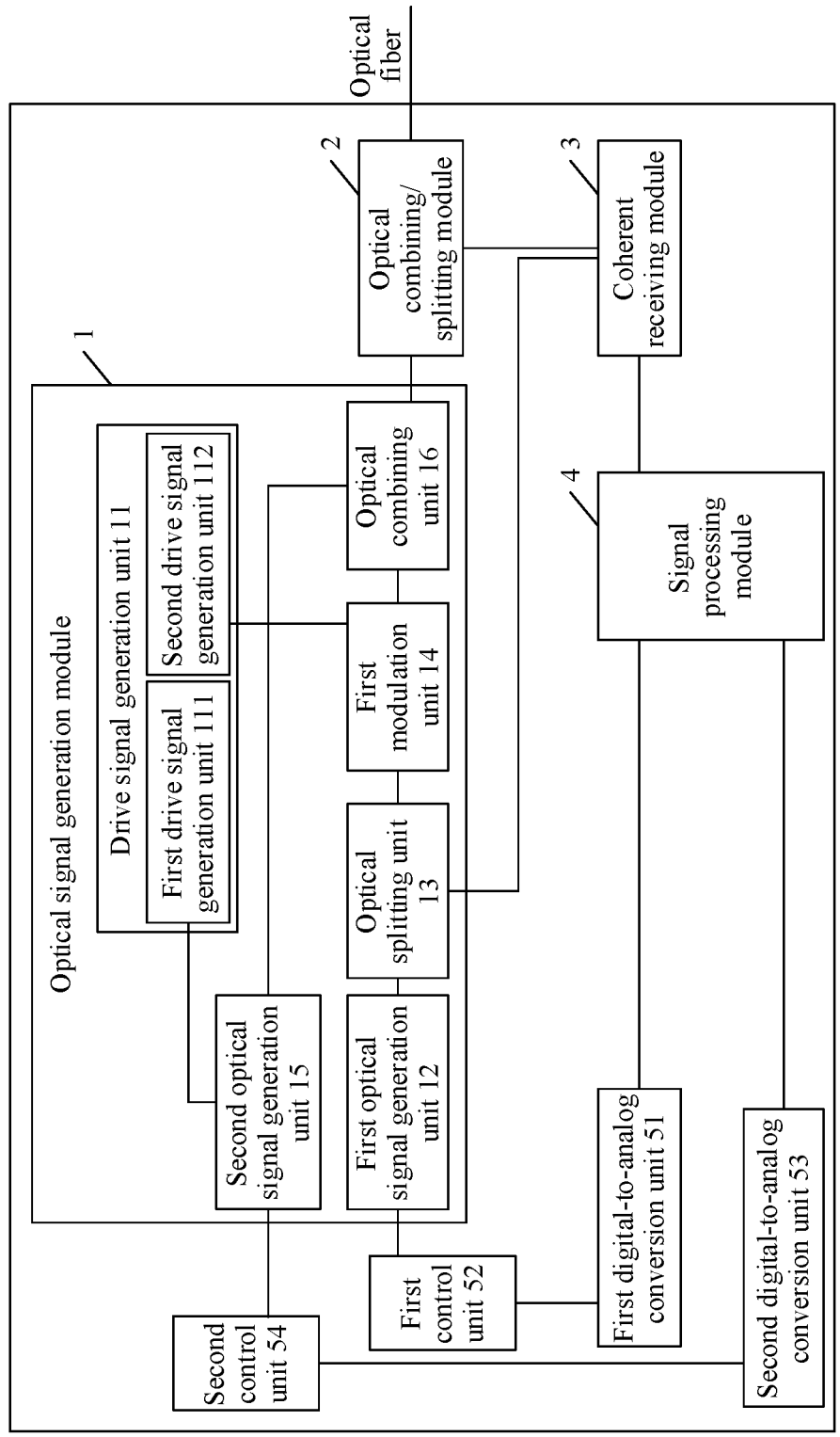
FIG. 3 is a schematic structural diagram of another optical signal transceiver apparatus according to an embodiment of this application.

In the second implementation, the optical signal generation module 1 in the second implementation is implemented based on the first implementation. Referring to FIG. 3, in addition to the components in the first implementation, the optical signal generation module 1 in the second implementation may further include a second optical signal generation unit 15 and an optical combining unit 16.

An input end of the second optical signal generation unit 15 is connected to the output end of the drive signal generation unit 11, and an output end of the second optical signal generation unit 15 is connected to a first input end of the optical combining unit 16. A second input end of the optical combining unit 16 is connected to the output end of the first modulation unit 14, and an output end of the optical combining unit 16 is connected to the first end of the optical combining/splitting module 2.

The second optical signal generation unit 15 is configured to: receive the first drive signal that is input by the drive signal generation unit 11 and that corresponds to the first signal; generate the first signal based on the first drive signal; and input the first signal into the optical combining unit 16.

The first modulation unit 14 is configured to: receive the second-channel optical signal that is input by the optical splitting unit 13 and the second drive signal that is input by the drive signal generation unit 11 and that corresponds to the second signal; modulate the second-channel optical signal into the second signal based on the second drive signal; and input the second signal into the optical combining unit 16.

The optical combining unit 16 is configured to couple the first signal and the second signal to the optical combining/splitting module 2.

Optionally, referring to FIG. 3, the drive signal generation unit 11 may include a first drive signal generation unit 111 and a second drive signal generation unit 112. The input end of the second optical signal generation unit 15 is connected to an output end of the first drive signal generation unit 111, and the second input end of the first modulation unit 14 is connected to an output end of the second drive signal generation unit 112.

The first drive signal generation unit 111 is configured to generate the first drive signal, and may input the first drive signal into the second optical signal generation unit 15 through the output end of the first drive signal generation unit 111. The second drive signal generation unit 112 is configured to generate the second drive signal, and may input the second drive signal into the first modulation unit 14 through the output end of the second drive signal generation unit 112.

Optionally, the second optical signal generation unit 15 may be a DFB laser, an ECL laser, a DBR laser, or the like, and the optical combining unit 16 may be an optical coupler.

Optionally, the first drive signal generation unit 111 may be an OSC driver and the second drive signal generation unit 112 may be an OTDR driver, or the first drive signal generation unit 111 may be an OTDR driver and the second drive signal generation unit 112 may be an OSC driver.

Figure 4:
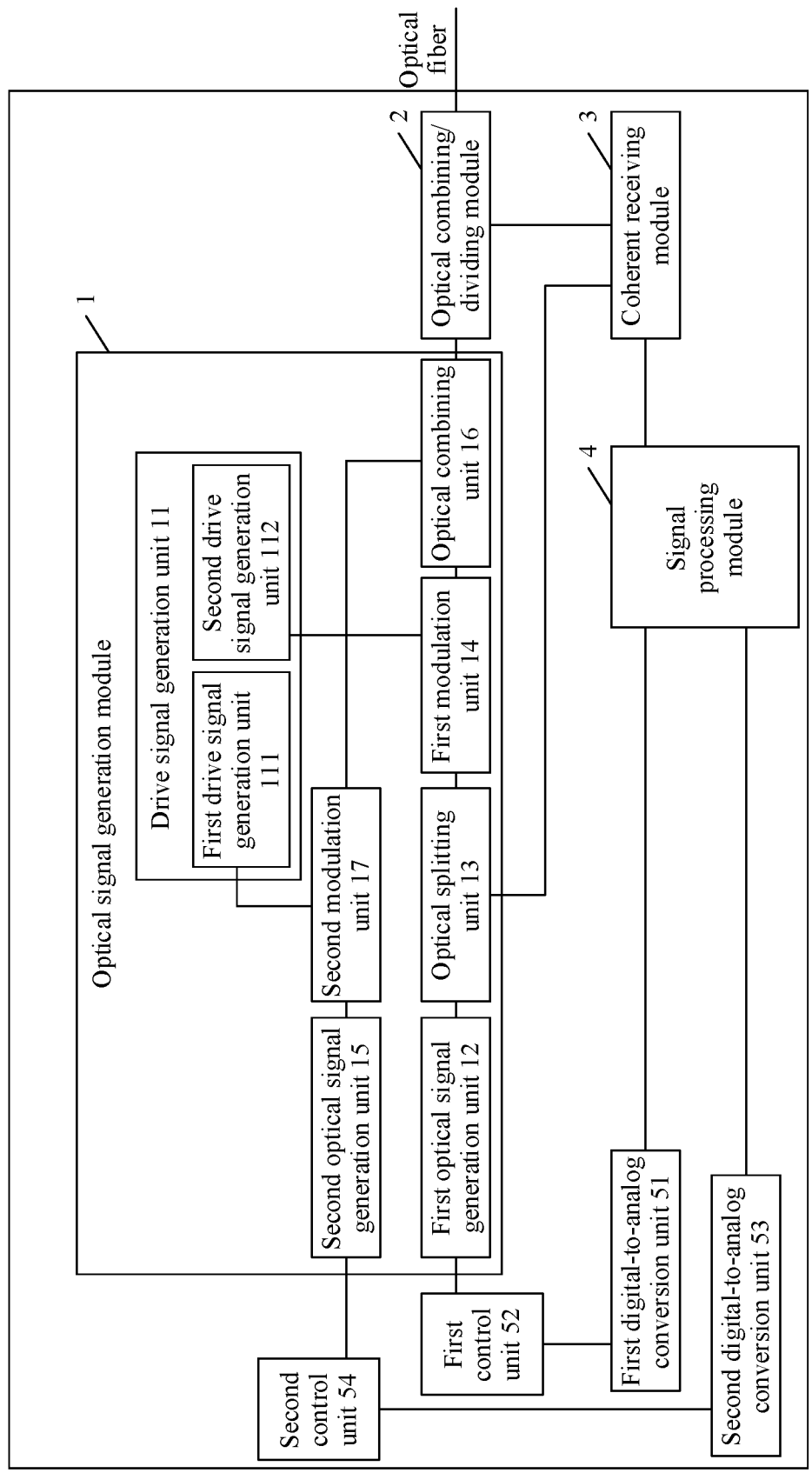
FIG. 4 is a schematic structural diagram of another optical signal transceiver apparatus according to an embodiment of this application.

In the third implementation, the optical signal generation module 1 in the third implementation is implemented based on the first implementation. Referring to FIG. 4, in addition to the components in the first implementation, the optical signal generation module 1 in the third implementation may further include a second optical signal generation unit 15, an optical combining unit 16, and a second modulation unit 17.

An output end of the second optical signal generation unit 15 is connected to a first input end of the second modulation unit 17. A second input end of the second modulation unit 17 is connected to the output end of the drive signal generation unit 11, and an output end of the second modulation unit 17 is connected to a first input end of the optical combining unit 16. A second input end of the optical combining unit 16 is connected to the output end of the first modulation unit 14, and an output end of the optical combining unit 16 is connected to the first end of the optical combining/splitting module 2.

The second optical signal generation unit 15 is configured to: generate an optical signal; and input the optical signal into the second modulation unit 17.

The second modulation unit 17 is configured to: receive the first drive signal that is input by the drive signal generation unit 11 and that corresponds to the first signal; modulate the optical signal into the first signal based on the first drive signal; and input the first signal into the optical combining unit 16.

The first modulation unit 14 is configured to: receive the second-channel optical signal that is input by the optical splitting unit 13 and the second drive signal that is input by the drive signal generation unit 11 and that corresponds to the second signal; modulate the second-channel optical signal into the second signal based on the second drive signal; and input the second signal into the optical combining unit 16.

The optical combining unit 16 is configured to couple the first signal and the second signal to the optical combining/splitting module 2.

Optionally, referring to FIG. 4, the drive signal generation unit 11 may include a first drive signal generation unit 111 and a second drive signal generation unit 112. The second input end of the second modulation unit 17 is connected to an output end of the first drive signal generation unit 111, and the second input end of the first modulation unit 14 is connected to an output end of the second drive signal generation unit 112.

The first drive signal generation unit 111 is configured to generate the first drive signal, and may input the first drive signal into the second modulation unit 17 by using the output end of the first drive signal generation unit 111.

The second drive signal generation unit 112 is configured to generate the second drive signal, and may input the second drive signal into the first modulation unit 14 by using the output end of the second drive signal generation unit 112.

Optionally, the second modulation unit 17 may be an SOA, an EAM, an MZM, or the like.

The second implementation or the third implementation achieves at least the following technical effects: The optical combining unit 16 may receive the first signal and the second signal that are input, couple the first signal and the second signal to the optical combining/splitting module 2, and input the first signal and the second signal into the optical fiber. In this way, the first OTDR signal and the second OSC signal can be simultaneously sent on the optical fiber.

Figure 5:
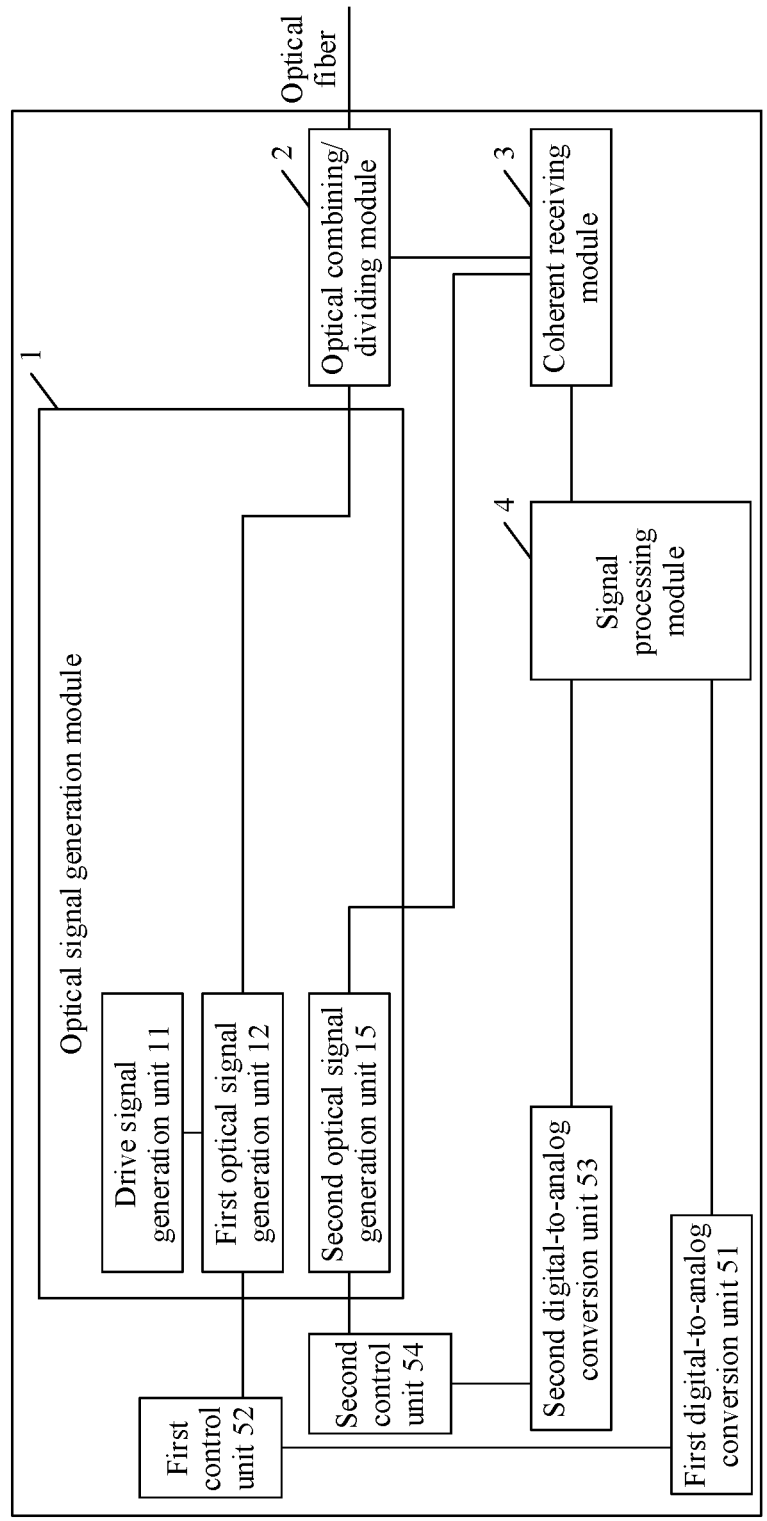
FIG. 5 is a schematic structural diagram of another optical signal transceiver apparatus according to an embodiment of this application.

In the fourth implementation, referring to FIG. 5, the optical signal generation module 1 includes:

a drive signal generation unit 11, a first optical signal generation unit 12, and a second optical signal generation unit 15.

An input end of the first optical signal generation unit 12 is connected to an output end of the drive signal generation unit 11, and an output end of the first optical signal generation unit 12 is connected to a first end of the optical combining/splitting module 2. An output end of the second optical signal generation unit 15 is connected to a first input end of the coherent receiving module 3.

The drive signal generation unit 11 is configured to: generate a drive signal corresponding to the to-be-sent optical signal; and input the drive signal into the first optical signal generation unit 12.

The first optical signal generation unit 12 is configured to generate the to-be-sent optical signal based on the drive signal; and input the to-be-sent optical signal into the optical combining/splitting module 2.

The second optical signal generation unit 15 is configured to generate the local oscillator optical signal; and input the local oscillator optical signal into the coherent receiving module 3.

Optionally, the drive signal generated by the drive signal generation unit 11 may include a first drive signal or a second drive signal.

When the drive signal generation unit 11 inputs the first drive signal into the first optical signal generation unit 12, the first optical signal generation unit 12 generates a first signal based on the first drive signal, and inputs the first signal into the optical fiber by using the optical combining/splitting module 2. When the drive signal generation unit 11 inputs the second drive signal into the first optical signal generation unit 12, the first optical signal generation unit 12 generates a second signal based on the second drive signal, and inputs the second signal into the optical fiber by using the optical combining/splitting module 2.

Figure 6:
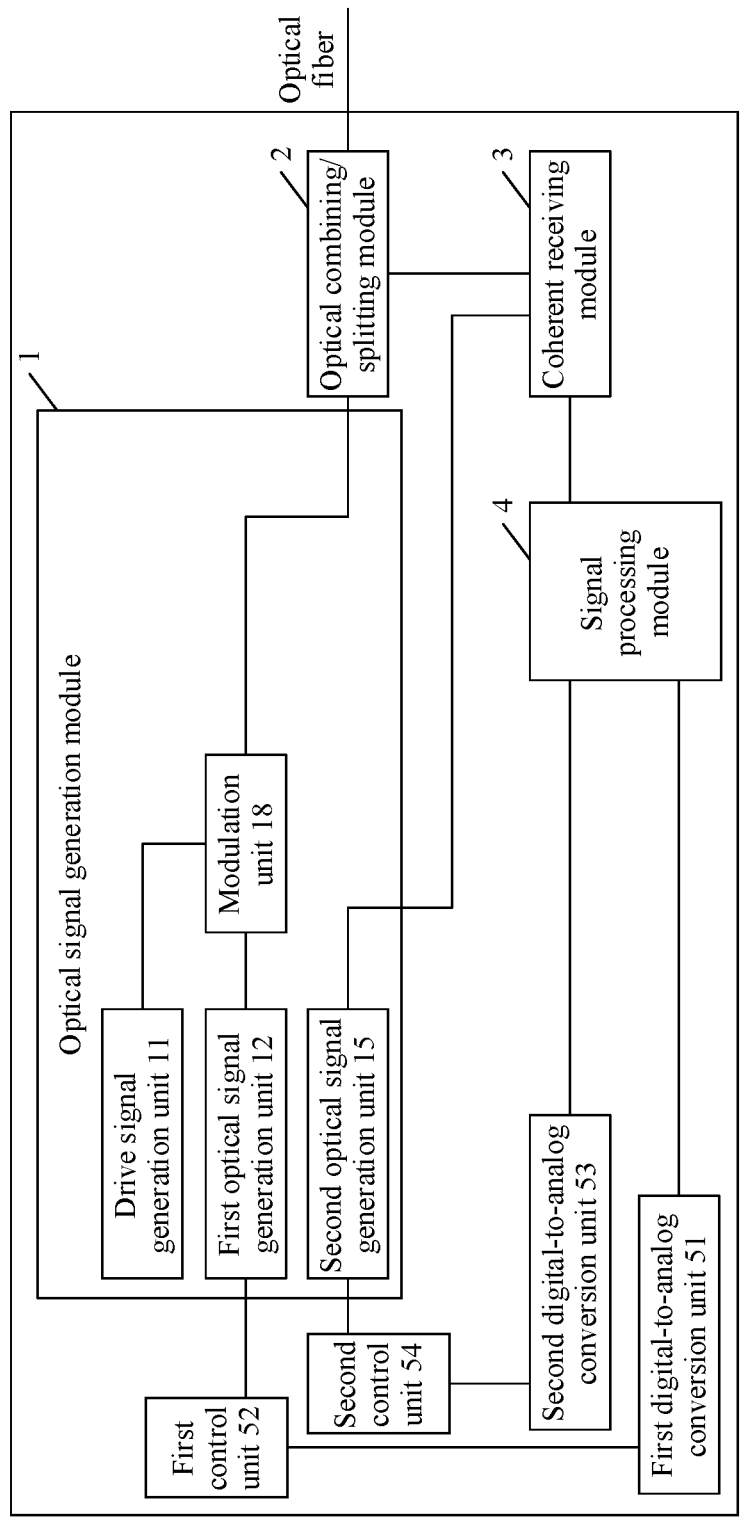
FIG. 6 is a schematic structural diagram of another optical signal transceiver apparatus according to an embodiment of this application.

In the fifth implementation, referring to FIG. 6, the optical signal generation module 1 includes:

a drive signal generation unit 11, a first optical signal generation unit 12, a second optical signal generation unit 15, and a modulation unit 18.

An output end of the first optical signal generation unit 12 is connected to a first input end of the modulation unit 18.

A second input end of the modulation unit 18 is connected to an output end of the drive signal generation unit 11, and an output end of the modulation unit 18 is connected to a first end of the optical combining/splitting module 2. An output end of the second optical signal generation unit 15 is connected to a first input end of the coherent receiving module 3.

The drive signal generation unit 11 is configured to: generate a drive signal corresponding to the to-be-sent optical signal; and input the drive signal into the modulation unit 18.

The first optical signal generation unit 12 is configured to: generate an optical signal; and input the optical signal into the modulation unit 18.

The modulation unit 18 is configured to: modulate the optical signal into the to-be-sent optical signal based on the drive signal; and input the to-be-sent optical signal into the optical combining/splitting module 2.

The second optical signal generation unit 15 is configured to: generate the local oscillator optical signal; and input the local oscillator optical signal into the coherent receiving module 3.

Optionally, in the fifth implementation, the drive signal generated by the drive signal generation unit 11 may include a first drive signal or a second drive signal.

When the drive signal generation unit 11 inputs the first drive signal into the modulation unit 18, the modulation unit 18 converts the optical signal into a first signal based on the first drive signal, and inputs the first signal into the optical fiber by using the optical combining/splitting module 2. When the drive signal generation unit 11 inputs the second drive signal into the modulation unit 18, the modulation unit 18 converts the optical signal into a second signal based on the second drive signal, and inputs the second signal into the optical fiber by using the optical combining/splitting module 2.

Figure 7:
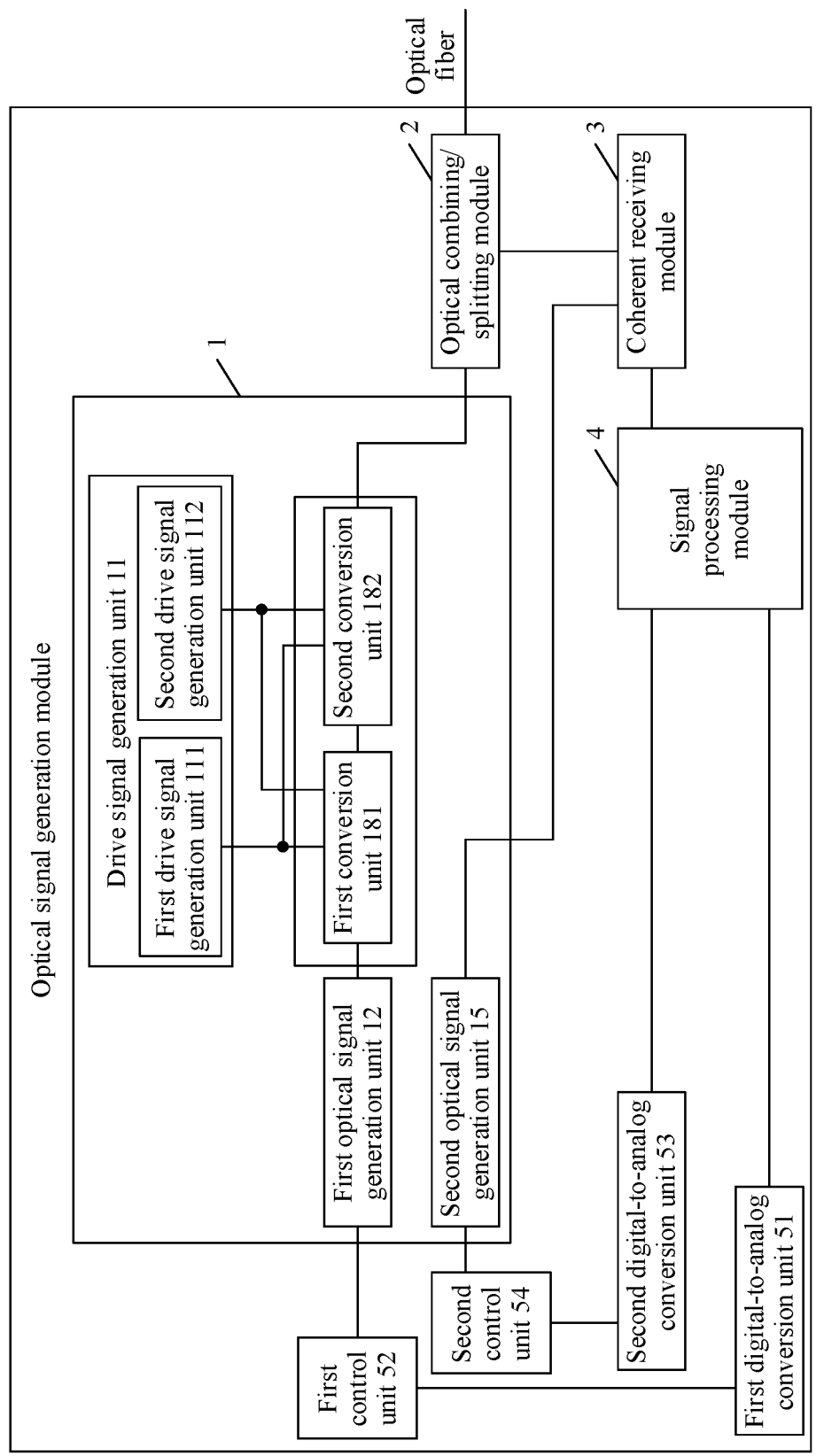
FIG. 7 is a schematic structural diagram of another optical signal transceiver apparatus according to an embodiment of this application.

Optionally, in the fifth implementation, referring to FIG. 7, the modulation unit 18 includes a first conversion unit 181 and a second conversion unit 182.

A first input end of the first conversion unit 181 is connected to the output end of the first optical signal generation unit 12, a second input end of the first conversion unit 181 is connected to the output end of the drive signal generation unit 11, and an output end of the first conversion unit 181 is connected to a first input end of the second conversion unit 182. A second input end of the second conversion unit 182 is connected to the output end of the drive signal generation unit 11, and an output end of the second conversion unit 182 is connected to the first end of the optical combining/splitting module 2.

The first conversion unit 181 is configured to: receive the first drive signal that is input by the drive signal generation unit 11 and that corresponds to the first signal and the optical signal that is input by the first optical signal generation unit 12; convert the optical signal into the first signal based on the first drive signal within a first time period used for generating the first signal; input the first signal into the optical combining/splitting module 2 by using the second conversion unit 182; and input the optical signal into the second conversion unit 182 within a second time period used for generating the second signal. The first time period and the second time period are two time periods that have no intersection.

The second conversion unit 182 is configured to: receive, within the second time period, the optical signal and the second drive signal that is input by the drive signal generation unit 11 and that corresponds to the second signal;

convert the optical signal into the second signal based on the second drive signal; and input the second signal into the optical combining/splitting module 2.

Optionally, referring to FIG. 7, the drive signal generation unit 11 may include a first drive signal generation unit 111 and a second drive signal generation unit 112. The second input end of the first conversion unit 181 is connected to an output end of the first drive signal generation unit 111, and the second input end of the second conversion unit 182 is connected to an output end of the second drive signal generation unit 112.

The first drive signal generation unit 11 is configured to generate the first drive signal, and may input the first drive signal into the first conversion unit 181 by using the output end of the first drive signal generation unit 11.

The second drive signal generation unit 112 is configured to generate the second drive signal, and may input the second drive signal into the second conversion unit 182 by using the output end of the second drive signal generation unit 112.

Optionally, the first conversion unit 181 may be an SOA, an EAM, an MZM, or the like, and the second conversion unit 182 may be an SOA, an EAM, an MZM, or the like.

Optionally, an extinction ratio of the first signal obtained by the first conversion unit 181 through conversion may not reach a required extinction ratio threshold, and an extinction ratio of the second signal obtained by the second conversion unit 182 through conversion may not reach the required extinction ratio threshold either. For example, it is assumed that the required extinction ratio threshold is a. The extinction ratio of the first signal obtained by the first conversion unit 181 through conversion is b, the extinction ratio of the second signal obtained by the second conversion unit 182 through conversion is also b, and b is less than a. In this case, neither the extinction ratio of the first signal nor the extinction ratio of the second signal reaches the extinction ratio threshold.

To enable the extinction ratio of the to-be-sent optical signal to reach the extinction ratio threshold, in the fifth implementation, still referring to FIG. 7, the second input end of the first conversion unit 181 may be connected to both the output end of the first drive signal generation unit 111 and the output end of the second drive signal generation unit 112, and the second input end of the second conversion unit 182 may be connected to both the output end of the first drive signal generation unit 111 and the output end of the second drive signal generation unit 112. In this way, the first drive signal generation unit 11 may input the first drive signal into both the first conversion unit 181 and the second conversion unit 182 within the first time period, and the second drive signal generation unit 112 may input the second drive signal into both the first conversion unit 181 and the second conversion unit 182 within the second time period.

Therefore, the first conversion unit 181 is configured to: receive, within the first time period, the first drive signal that is input by the drive signal generation unit 11 and the optical signal that is input by the first optical signal generation unit 12; convert the optical signal into the first signal based on the first drive signal; input the first signal into the second conversion unit 182; receive, within the second time period, the second drive signal that is input by the drive signal generation unit 11 and the optical signal that is input by the first optical signal generation unit 12; convert the optical signal into the second signal based on the second drive signal; and input the second signal into the second conversion unit 182. It should be noted that the extinction ratio of the first signal obtained by the first conversion unit 181 through conversion and the extinction ratio of the second signal obtained by the first conversion unit 181 through conversion each may be relatively low, and each do not reach the required extinction ratio threshold.

The second conversion unit 182 is configured to: receive, within the first time period, the first signal and the first drive signal that is input by the drive signal generation unit 11; convert the first signal into a third signal based on the first drive signal; input the third signal into the optical combining/splitting module 2; receive, within the second time period, the second signal and the second drive signal that is input by the drive signal generation unit 11; convert the second signal into a fourth signal based on the second drive signal; and input the fourth signal into the optical combining/splitting module 2. It should be noted that an extinction ratio of the third signal obtained by the second conversion unit 182 through conversion is greater than the extinction ratio of the first signal, the extinction ratio of the third signal reaches the required extinction ratio threshold, an extinction ratio of the fourth signal obtained by the second conversion unit 182 through conversion is greater than the extinction ratio of the second signal, and the extinction ratio of the fourth signal reaches the required extinction ratio threshold.

In this implementation, the to-be-sent optical signal includes the third signal and the fourth signal; and the third signal includes the first OTDR signal and the fourth signal includes the second OSC signal, or the third signal includes the second OSC signal and the fourth signal includes the first OTDR signal.

For example, assuming that the extinction ratio of the first signal obtained by the first conversion unit 181 through conversion is b and b is less than the extinction ratio threshold a, the third signal whose extinction ratio is greater than or equal to a may be obtained after the first signal is further converted by the second conversion unit 182. Similarly, assuming that the extinction ratio of the second signal obtained by the first conversion unit 181 through conversion is b, the fourth signal whose extinction ratio is greater than or equal to a may be obtained after the second signal is further converted by the second conversion unit 182.

Figure 8:
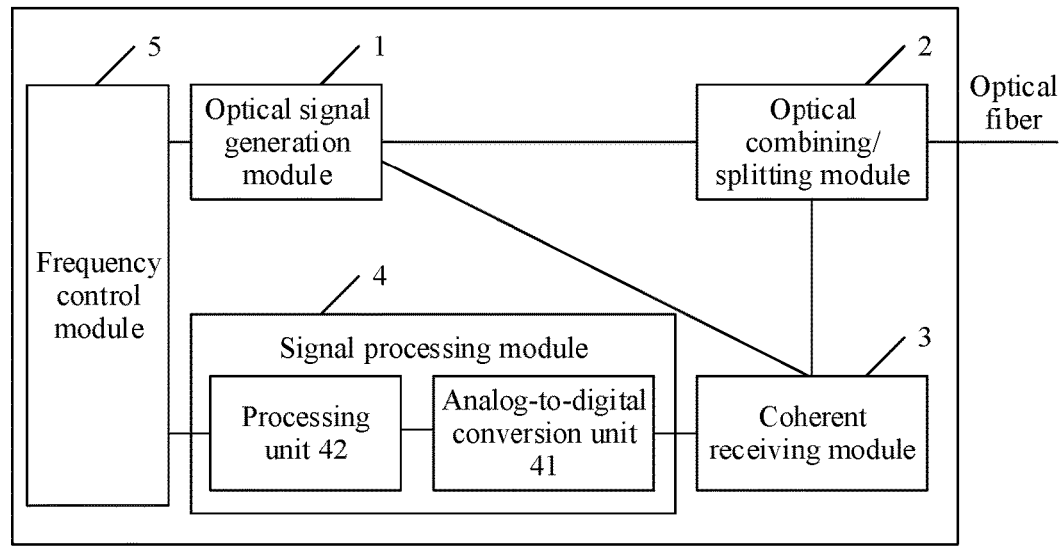
FIG. 8 is a schematic structural diagram of another optical signal transceiver apparatus according to an embodiment of this application.

Optionally, referring to FIG. 8, the signal processing module 4 may include:

an analog-to-digital conversion unit 41 and a processing unit 42.

An input end of the analog-to-digital conversion unit 41 is connected to the output end of the coherent receiving module 3, and an output end of the analog-to-digital conversion unit 41 is connected to an input end of the processing unit 42.

The analog-to-digital conversion unit 41 is configured to: receive the to-be-processed electrical signal that is input by the coherent receiving module 3; convert the to-be-processed electrical signal into a digital signal; and input the digital signal into the processing unit 42. The digital signal includes the first digital signal corresponding to the first OSC signal and the second digital signal corresponding to the second OTDR signal.

The processing unit 42 is configured to: obtain, from the digital signal based on the signal frequency, the first digital signal corresponding to the first OSC signal and the second digital signal corresponding to the second OTDR signal; process the first digital signal to obtain the communications code stream; and process the second digital signal to obtain the information used to reflect the feature of the optical fiber.

The processing unit 42 has a filtering function, and may obtain, from the digital signal through filtering based on the signal frequency, the first digital signal corresponding to the first OSC signal and the second digital signal corresponding to the second OTDR signal.

Optionally, the processing unit 42 may be an application-specific integrated circuit (ASIC) dedicated chip, a field-programmable gate array (FPGA), a single-chip microcomputer, or the like.

Figure 9:
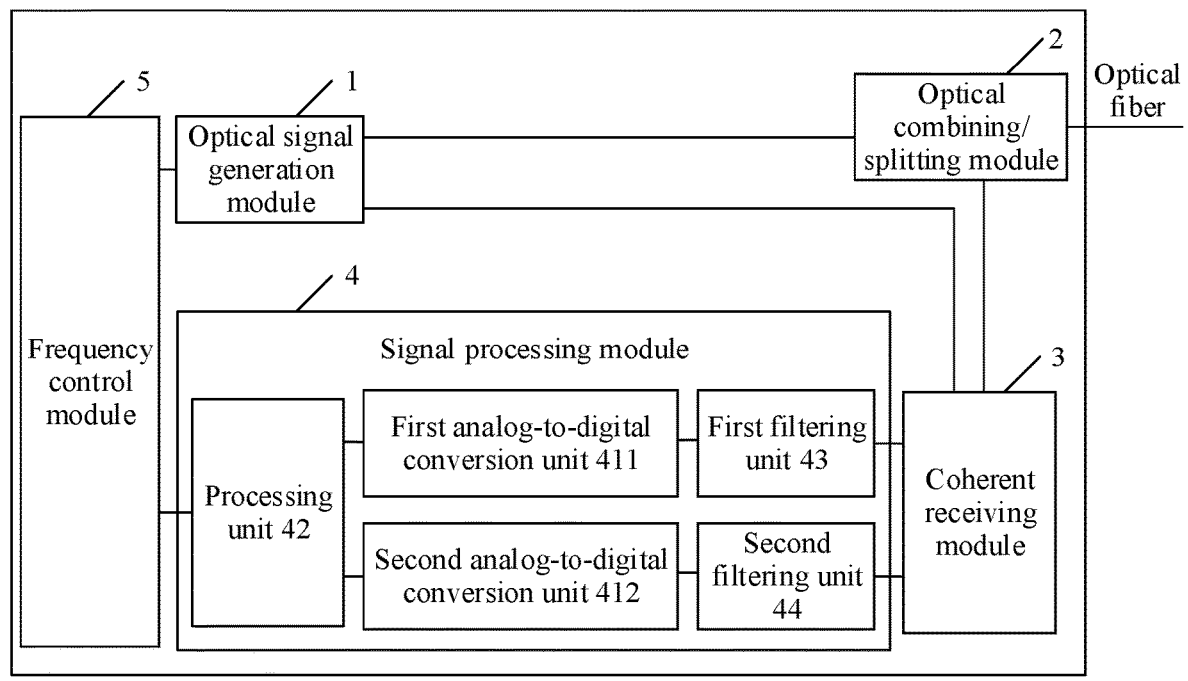
FIG. 9 is a schematic structural diagram of another optical signal transceiver apparatus according to an embodiment of this application.

Optionally, the processing unit 42 may alternatively not have a filtering function. Referring to FIG. 9, the signal processing module 4 may further include a first filtering unit 43 and a second filtering unit 44.

The analog-to-digital conversion unit 41 includes a first analog-to-digital conversion unit 411 and a second analog-to-digital conversion unit 412.

An input end of the first filtering unit 43 is connected to the output end of the coherent receiving module 3, and an output end of the first filtering unit 43 is connected to an input end of the first analog-to-digital conversion unit 411. An output end of the first analog-to-digital conversion unit 411 is connected to the input end of the processing unit 42.

An input end of the second filtering unit 44 is connected to the output end of the coherent receiving module 3, and an output end of the second filtering unit 44 is connected to an input end of the second analog-to-digital conversion unit 412. An output end of the second analog-to-digital conversion unit 412 is connected to the input end of the processing unit 42.

The first filtering unit 43 is configured to: receive the to-be-processed electrical signal that is input by the coherent receiving module 3; obtain, from the to-be-processed electrical signal through filtering, a first electrical signal corresponding to the first OSC signal; and input the first electrical signal corresponding to the first OCS signal into the first analog-to-digital conversion unit 411.

The first analog-to-digital conversion unit 411 is configured to: convert the first electrical signal corresponding to the first OCS signal into the first digital signal; and input the first digital signal into the processing unit 42.

The second filtering unit 44 is configured to: receive the to-be-processed electrical signal that is input by the coherent receiving module 3; obtain, from the to-be-processed electrical signal through filtering, a second electrical signal corresponding to the second OTDR signal; and input the second electrical signal corresponding to the second OTDR signal into the second analog-to-digital conversion unit 412.

The second analog-to-digital conversion unit 412 is configured to: convert the second electrical signal corresponding to the second OTDR signal into the second digital signal; and input the second digital signal into the processing unit 42.

The processing unit 42 may receive the first digital signal, process the first digital signal to obtain the communications code stream, receive the second digital signal, and process the second digital signal to obtain the information used to reflect the feature of the optical fiber.

Optionally, in any one of the foregoing embodiments, to enable the frequency of the first OSC signal to be different from the frequency of the second OTDR signal, the following two implementations may be listed in this embodiment of this application:

In the first implementation, it is set that a frequency of an optical signal generated by the optical signal generation module 1 in the first device is different from a frequency of an optical signal generated by an optical signal generation module in the second device.

In the first implementation, the frequency of the optical signal generated by the optical signal generation module 1 in the first device may remain unchanged, the frequency of the optical signal generated by the optical signal generation module 1 in the second device may remain unchanged, and a difference between the frequency of the optical signal generated by the optical signal generation module 1 in the first device and the frequency of the optical signal generated by the optical signal generation module in the second device may be greater than or equal to a preset difference.

In the second implementation, referring to FIG. 1 to FIG. 8, it may be set that the apparatus includes a frequency control module 5, and the frequency control module 5 adjusts the frequency of the optical signal generated by the optical signal generation module 1 in the first device, so that the frequency of the first OSC signal is different from the frequency of the second OTDR signal.

An output end of the signal processing module 4 is connected to an input end of the frequency control module 5, and the frequency control module 5 is further connected to the optical signal generation module 1.

The signal processing module 4 is further configured to: obtain a frequency offset of the first OSC signal relative to the local oscillator optical signal; and control, based on the frequency offset by using the frequency control module 5, a difference between a frequency of an OTDR signal generated by the optical signal generation module 1 and the frequency of the first OSC signal to be greater than or equal to a preset difference.

Optionally, the signal processing module 4 may also control, by using the frequency control module 5, a difference between the frequency of the second OSC signal generated by the optical signal generation module 1 and the frequency of the first OSC signal to be greater than or equal to a preset difference.

When the coherent receiving module 3 coherently receives the local oscillator optical signal that is input by the optical signal generation module 1 and the to-be-processed optical signal that is input by the optical combining/splitting module 2, the coherent receiving module 3 combines the local oscillator optical signal and the to-be-processed optical signal, and then converts a combined optical signal into the to-be-processed electrical signal. Therefore, the to-be-processed electrical signal includes a third electrical signal corresponding to the local oscillator optical signal and the first electrical signal corresponding to the first OSC signal, and the signal processing module 4 may directly obtain, from the to-be-processed electrical signal, the third digital signal corresponding to the local oscillator optical signal and the first digital signal corresponding to the first OSC signal, to further calculate the frequency offset of the first OSC signal relative to the local oscillator optical signal based on the third digital signal and the first digital signal.

Optionally, referring to FIG. 2, the frequency control module 5 includes a first digital-to-analog conversion unit 51 and a first control unit 52.

An input end of the first digital-to-analog conversion unit 51 is connected to the output end of the signal processing module 4, and an output end of the first digital-to-analog conversion unit 51 is connected to an input end of the first control unit 52. The first control unit 52 is further connected to the first optical signal generation unit 12 in the optical signal generation module 1.

The first digital-to-analog conversion unit 51 is configured to: receive a first adjustment signal that is input by the signal processing module 4; convert the first adjustment signal into a first analog signal; and input the first analog signal into the first control unit 52. The first adjustment signal is used to adjust a frequency of the optical signal generated by the first optical signal generation unit 12.

The first control unit 52 is configured to control a temperature or an operating current of the first optical signal generation unit 12 based on the first analog signal, to adjust the frequency of the optical signal generated by the first optical signal generation unit 12.

The signal processing module 4 may calculate a difference between the frequency offset and a preset value based on the frequency offset of the first OSC signal relative to the local oscillator optical signal and the preset value, generate the first adjustment signal corresponding to the difference, and input the first adjustment signal into the first digital-to-analog conversion unit 51.

The first control unit 52 receives the first analog signal obtained by the first digital-to-analog conversion unit 51 by converting the first adjustment signal, and increases or decreases, based on the first analog signal, the operating current supplied to the first optical signal generation unit 12, so that the first optical signal generation unit 12 increases or decreases the frequency of the generated optical signal, and the difference between the frequency of the optical signal generated by the first optical signal generation unit 12 and the frequency of the first OSC signal is equal to the preset difference. Alternatively, the first control unit 52 heats or cools the first optical signal generation unit 12 based on the first analog signal, so that the first optical signal generation unit 12 increases or decreases the frequency of the generated optical signal, and the difference between the frequency of the optical signal generated by the first optical signal generation unit 12 and the frequency of the first OSC signal is equal to the preset difference.

Figure 10:
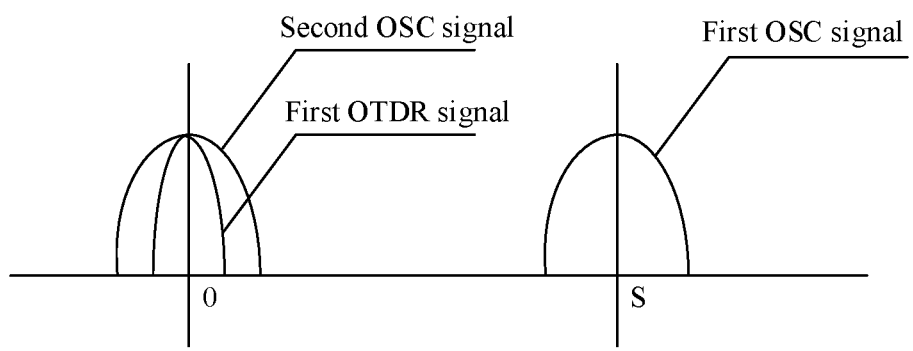
FIG. 10 is a diagram of a relationship between a frequency of an OSC signal and a frequency of an OTDR signal according to an embodiment of this application.

Optionally, in the embodiment shown in FIG. 2, the first optical signal generation unit 12 may generate the first OTDR signal and the second OSC signal. Referring to FIG. 10, a frequency of the first OTDR signal generated by the first optical signal generation unit 12 is the same as a frequency of the second OSC signal. The first control unit 52 may control a difference between the frequency of the first OTDR signal generated by the first optical signal generation unit 12 and the frequency of the first OSC signal to be equal to the preset value S, and control a difference between the frequency of the second OSC signal generated by the first optical signal generation unit 12 and the frequency of the first OSC signal to be equal to the preset value S.

Optionally, in the embodiment shown in FIG. 3, in an implementation in which the optical signal generation module 1 further includes the second optical signal generation unit 15, a frequency of an optical signal generated by the second optical signal generation unit 15 may be adjusted.

The preset difference may include a first preset value S1 and a second preset value S2. The first control unit 52 may control a difference between the frequency of the second signal generated by the first optical signal generation unit 12 and the frequency of the first OSC signal to be equal to the first preset value S1, and may control a difference between the frequency of the first signal generated by the second optical signal generation unit 15 and the frequency of the first OSC signal to be always equal to the second preset value S2.

In view of this, referring to FIG. 3, the frequency control module 5 further includes a second digital-to-analog conversion unit 53 and a second control unit 54.

An input end of the second digital-to-analog conversion unit 53 is connected to the output end of the signal processing module 4, and an output end of the second digital-to-analog conversion unit 53 is connected to an input end of the second control unit 54. The second control unit 54 is further connected to the second optical signal generation unit 15 in the optical signal generation module 1.

The second digital-to-analog conversion unit 53 is configured to: receive a second adjustment signal that is input by the signal processing module 4; convert the second adjustment signal into a second analog signal; and input the second analog signal into the second control unit 54. The second adjustment signal is used to adjust a frequency of the optical signal generated by the second optical signal generation unit 15.

The second control unit 54 is configured to control a temperature or an operating current of the second optical signal generation unit 15 based on the second analog signal, to adjust the frequency of the optical signal generated by the second optical signal generation unit 15.

Optionally, the signal processing module 4 may obtain a first frequency offset of the frequency of the first OSC signal relative to the frequency of the optical signal generated by the first optical signal generation unit 12, calculate a first difference between the first frequency offset and the first preset value S1 based on the first frequency offset and the first preset value S1, to generate the first adjustment signal corresponding to the first difference, and input the first adjustment signal into the first digital-to-analog conversion unit 51.

Figure 11:
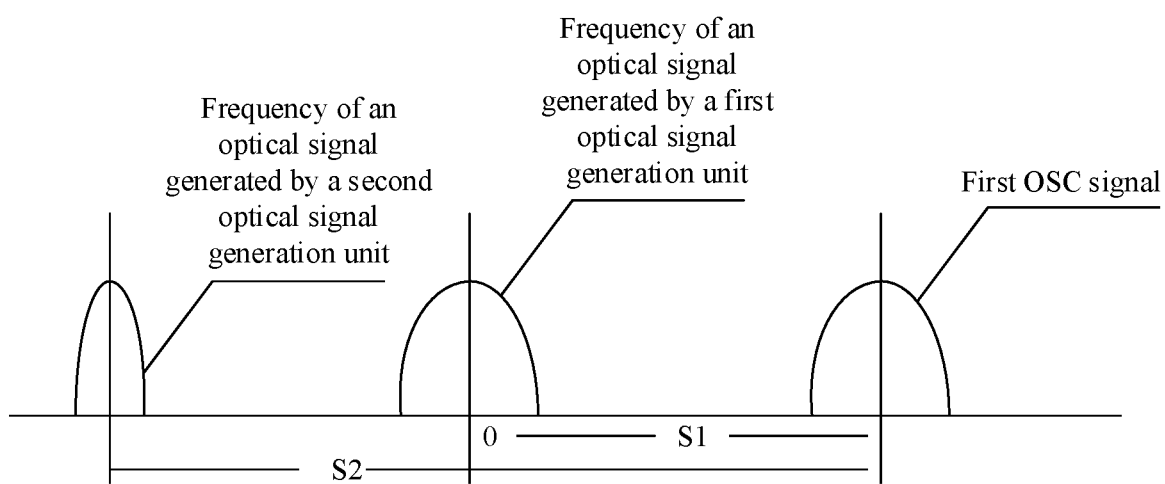
FIG. 11 is a diagram of a relationship between a frequency of an OSC signal, a frequency of an optical signal generated by a first optical signal generation unit, and a frequency of an optical signal generated by a second optical signal generation unit according to an embodiment of this application.

Referring to FIG. 11, the first control unit 52 receives the first analog signal obtained by the first digital-to-analog conversion unit 51 by converting the first adjustment signal, and increases or decreases, based on the first analog signal, the operating current supplied to the first optical signal generation unit 12, so that the first optical signal generation unit 12 increases or decreases the frequency of the generated optical signal, and the difference between the frequency of the optical signal generated by the first optical signal generation unit 12 and the frequency of the first OSC signal is equal to the first preset value S1. Alternatively, the first control unit 52 heats or cools the first optical signal generation unit 12 based on the first analog signal, so that the first optical signal generation unit 12 increases or decreases the frequency of the generated optical signal, and the difference between the frequency of the optical signal generated by the first optical signal generation unit 12 and the frequency of the first OSC signal is equal to the first preset value S1.

The signal processing module 4 may obtain a second frequency offset of the frequency of the first OSC signal relative to the frequency of the optical signal generated by the second optical signal generation unit 15, calculate a second difference between the second frequency offset and the second preset value S2 based on the second frequency offset and the second preset value S2, to generate the second adjustment signal corresponding to the second difference, and input the second adjustment signal into the second digital-to-analog conversion unit 53.

The second control unit 54 receives the second analog signal obtained by the second digital-to-analog conversion unit 53 by converting the second adjustment signal, and increases or decreases, based on the second analog signal, the operating current supplied to the second optical signal generation unit 15, so that the second optical signal generation unit 15 increases or decreases the frequency of the generated optical signal, and a difference between the frequency of the optical signal generated by the second optical signal generation unit 15 and the frequency of the first OSC signal is equal to the second preset value S2. Alternatively, the second control unit 54 heats or cools the second optical signal generation unit 15 based on the second analog signal, so that the second optical signal generation unit 15 increases or decreases the frequency of the generated optical signal, and the difference between the frequency of the optical signal generated by the second optical signal generation unit 15 and the frequency of the first OSC signal is equal to the second preset value S2.

When receiving the second OSC signal sent by the first device, the optical signal transceiver apparatus in the second device also adjusts, in the foregoing manner, a frequency of an optical signal generated by the optical signal transceiver apparatus in the second device. An adjustment process is not described in detail herein again.

Optionally, the processing unit 42 is further configured to perform one or more of an optical fiber dispersion measurement operation, an optical fiber mode field diameter measurement operation, and an SOP event positioning and rotation speed monitoring operation based on the communications code stream and/or the information used to reflect the feature of the optical fiber.

When the optical fiber dispersion measurement operation is implemented, the processing unit 42 controls, by using the frequency control module 5, the optical signal generation module 1 to generate at least two first OTDR signals, and frequencies of the first OTDR signals are different. The optical combining/splitting module 2 receives a second OTDR signal that is obtained by the optical fiber by reflecting and scattering and that corresponds to each generated first OTDR signal. The processing unit 42 may obtain a reflection delay corresponding to each second OTDR, where the reflection delay is information used to reflect the feature of the optical fiber, and perform the optical fiber dispersion measurement operation based on the reflection delay corresponding to each second OTDR.

In the embodiments of this application, the coherent receiving module coherently receives the local oscillator optical signal and the to-be-processed optical signal, and coherent receiving sensitivity of the coherent receiving module is relatively high and is usually higher than that of a photoelectric detector. Therefore, when the coherent receiving module performs coherent receiving, a dynamic range for detecting an OTDR signal in the to-be-processed optical signal can be expanded. In addition, the signal processing module may obtain, from the to-be-processed electrical signal based on the signal frequency, the first digital signal corresponding to the first OSC signal and the second digital signal corresponding to the second OTDR signal, so that one coherent receiving module may coherently receive the to-be-processed optical signal. This reduces a quantity of devices and reduces costs. Moreover, the optical signal generation module may input the local oscillator optical signal into the coherent receiving module, so that a laser configured to generate a local oscillator optical signal does not need to be independently disposed for the coherent receiving module. This further reduces a quantity of devices and reduces costs.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An optical signal transceiver apparatus, wherein the apparatus comprises an optical signal generator, an optical combining/splitting module, a coherent receiver, and a signal processor, and wherein:

the optical signal generator is configured to:
generate a to-be-sent optical signal and a local oscillator optical signal, wherein the to-be-sent optical signal comprises a first optical time domain reflectometer (OTDR) signal;
input the local oscillator optical signal into the coherent receiver; and
input the to-be-sent optical signal into an optical fiber by using the optical combining/splitting module;
the optical combining/splitting module is configured to:
receive a to-be-processed optical signal from the optical fiber; and
input the to-be-processed optical signal into the coherent receiver, wherein the to-be-processed optical signal comprises a first optical supervisory channel (OSC) signal and a second OTDR signal that is obtained by the optical fiber by at least one of reflecting or scattering the first OTDR signal, wherein a frequency of the first OSC signal is different from a frequency of the second OTDR signal, and wherein a difference between the frequency of the first OSC signal and the frequency of the second OTDR signal is less than a processing bandwidth of the coherent receiver;
the coherent receiver is configured to:
coherently receive the local oscillator optical signal and the to-be-processed optical signal to obtain a to-be-processed electrical signal; and
send the to-be-processed electrical signal to the signal processor; and
the signal processor is configured to:
obtain, from the to-be-processed electrical signal based on a signal frequency, a first digital signal corresponding to the first OSC signal and a second digital signal corresponding to the second OTDR signal;
process the first digital signal to obtain a communications code stream; and
process the second digital signal to obtain information used to reflect a feature of the optical fiber.

2. The apparatus according to claim 1, wherein the optical signal generator comprises a drive signal generator, a first optical signal generator, an optical splitter, and a first modulator, and wherein:
the drive signal generator is configured to:
generate a drive signal corresponding to the to-be-sent optical signal; and
input the drive signal into the first modulator;
the first optical signal generator is configured to:
generate an optical signal; and
input the optical signal into the optical splitter;
the optical splitter is configured to:
split the optical signal into a first-channel optical signal and a second-channel optical signal;
input the first-channel optical signal into the coherent receiver; and
input the second-channel optical signal into the first modulator; and
the first modulator is configured to modulate the second-channel optical signal into the to-be-sent optical signal based on the drive signal.

3. The apparatus according to claim 2, wherein the to-be-sent optical signal comprises a first signal and a second signal, wherein the first signal comprises the first OTDR signal and the second signal comprises a second OSC signal, or the first signal comprises a second OSC signal and the second signal comprises the first OTDR signal, wherein the optical signal generator further comprises a second optical signal generator and an optical combiner, and wherein:

the second optical signal generator is configured to:
receive a first drive signal that is input by the drive signal generator and that corresponds to the first signal;
generate the first signal based on the first drive signal; and
input the first signal into the optical combiner;
the first modulator is configured to:
receive the second-channel optical signal that is input by the optical splitter and a second drive signal that is input by the drive signal generator and that corresponds to the second signal;
modulate the second-channel optical signal into the second signal based on the second drive signal; and
input the second signal into the optical combiner; and
the optical combiner is configured to couple the first signal and the second signal to the optical combining/splitting module.

4. The apparatus according to claim 3, further comprising a frequency controller, wherein the signal processor is further configured to:
obtain a frequency offset of the first OSC signal relative to the local oscillator optical signal; and
control, based on the frequency offset by using the frequency controller, a difference between a frequency of the first OTDR signal generated by the optical signal generator and the frequency of the first OSC signal to be greater than or equal to a preset difference.

5. The apparatus according to claim 4, wherein the frequency controller comprises a first digital-to-analog converter and a first controller, and wherein:
the first digital-to-analog converter is configured to:
receive a first adjustment signal that is input by the signal processor;
convert the first adjustment signal into a first analog signal; and
input the first analog signal into the first controller, wherein the first adjustment signal is used to adjust a frequency of the optical signal generated by the first optical signal generator; and
the first controller is configured to control a temperature or an operating current of the first optical signal generator based on the first analog signal to adjust the frequency of the optical signal generated by the first optical signal generator.

6. The apparatus according to claim 5, wherein the frequency controller further comprises a second digital-to-analog converter and a second controller, and wherein:
the second digital-to-analog converter is configured to:
receive a second adjustment signal that is input by the signal processor;
convert the second adjustment signal into a second analog signal; and
input the second analog signal into the second controller, wherein the second adjustment signal is used to adjust a frequency of the optical signal generated by the second optical signal generator; and
the second controller is configured to control a temperature or an operating current of the second optical signal generator based on the second analog signal to adjust the frequency of the optical signal generated by the second optical signal generator.

7. The apparatus according to claim 2, wherein the to-be-sent optical signal comprises a first signal and a second signal, wherein the first signal comprises the first OTDR signal and the second signal comprises a second OSC signal, or the first signal comprises a second OSC signal and the second signal comprises the first OTDR signal, wherein the optical signal generator further comprises a second optical signal generator, a second modulator, and an optical combiner, and wherein:
the second optical signal generator is configured to:
generate an optical signal; and
input the optical signal into the second modulator;
the second modulator is configured to:
receive a first drive signal that is input by the drive signal generator and that corresponds to the first signal;
modulate the optical signal into the first signal based on the first drive signal; and
input the first signal into the optical combiner;
the first modulator is configured to:
receive the second-channel optical signal that is input by the optical splitter and a second drive signal that is input by the drive signal generator and that corresponds to the second signal;
modulate the second-channel optical signal into the second signal based on the second drive signal; and
input the second signal into the optical combiner; and
the optical combiner is configured to couple the first signal and the second signal to the optical combining/splitting module.

8. The apparatus according to claim 1, wherein the optical signal generator comprises a drive signal generator, a first optical signal generator, and a second optical signal generator, and wherein:
the drive signal generator is configured to:
generate a drive signal corresponding to the to-be-sent optical signal; and
input the drive signal into the first optical signal generator;
the first optical signal generator is configured to:
generate the to-be-sent optical signal based on the drive signal; and
input the to-be-sent optical signal into the optical combining/splitting module; and
the second optical signal generator is configured to:
generate the local oscillator optical signal; and
input the local oscillator optical signal into the coherent receiver.

9. The apparatus according to claim 1, wherein the optical signal generator comprises a drive signal generator, a first optical signal generator, a second optical signal generator, and a modulator, and wherein:
the drive signal generator is configured to:
generate a drive signal corresponding to the to-be-sent optical signal; and
input the drive signal into the modulator;
the first optical signal generator is configured to:
generate an optical signal; and
input the optical signal into the modulator;
the modulator is configured to:
modulate the optical signal into the to-be-sent optical signal based on the drive signal; and
input the to-be-sent optical signal into the optical combining/splitting module; and
the second optical signal generator is configured to:
generate the local oscillator optical signal; and
input the local oscillator optical signal into the coherent receiver.

10. The apparatus according to claim 9, wherein the to-be-sent optical signal comprises a first signal and a second signal, wherein the first signal comprises the first OTDR signal and the second signal comprises a second OSC signal, or the first signal comprises a second OSC signal and the second signal comprises the first OTDR signal, wherein the modulator comprises a first converter and a second converter, and wherein:
  the first converter is configured to:
    receive a first drive signal that is input by the drive signal generator and that corresponds to the first signal and the optical signal that is input by the first optical signal generator;
    convert the optical signal into the first signal based on the first drive signal within a first time period used for generating the first signal; and
    input the first signal into the optical combining/splitting module by using the second converter; and
  the second converter is configured to:
    receive, within a second time period, the optical signal and a second drive signal that is input by the drive signal generator and that corresponds to the second signal;
    convert the optical signal into the second signal based on the second drive signal; and
    input the second signal into the optical combining/splitting module, wherein the first time period and the second time period are two time periods that have no intersection.

11. The apparatus according to claim 9, wherein the to-be-sent optical signal comprises a third signal and a fourth signal, wherein the third signal comprises the first OTDR signal and the fourth signal comprises a second OSC signal, or the third signal comprises a second OSC signal and the fourth signal comprises the first OTDR signal, wherein the modulator comprises a first converter and a second converter, and wherein:
  the first converter is configured to:
    receive, within a first time period, a first drive signal that is input by the drive signal generator and that corresponds to the third signal and the optical signal that is input by the first optical signal generator;
    convert the optical signal into a first signal based on the first drive signal;
    input the first signal into the second converter;
    receive, within a second time period, a second drive signal that is input by the drive signal generator and that corresponds to the fourth signal and the optical signal that is input by the first optical signal generator;
    convert the optical signal into a second signal based on the second drive signal; and
    input the second signal into the second converter, wherein the first time period and the second time period are two time periods that have no intersection; and
  the second converter is configured to:
    receive, within the first time period, the first signal and the first drive signal that is input by the drive signal generator and that corresponds to the third signal;
    convert the first signal into the third signal based on the first drive signal;
    input the third signal into the optical combining/splitting module;
    receive, within the second time period, the second signal and the second drive signal that is input by the drive signal generator and that corresponds to the fourth signal;
    convert the second signal into the fourth signal based on the second drive signal; and
    input the fourth signal into the optical combining/splitting module.

12. The apparatus according to claim 1, wherein the signal processor comprises an analog-to-digital converter and a first processor, and wherein:
  the analog-to-digital converter is configured to:
    receive the to-be-processed electrical signal that is input by the coherent receiver;
    convert the to-be-processed electrical signal into a digital signal; and
    input the digital signal into the first processor; and
  the first processor is configured to:
    obtain, from the digital signal based on the signal frequency, the first digital signal corresponding to the first OSC signal and the second digital signal corresponding to the second OTDR signal;
    process the first digital signal to obtain the communications code stream; and
    process the second digital signal to obtain the information used to reflect the feature of the optical fiber.

13. The apparatus according to claim 12, wherein the first processor is further configured to perform one or more of an optical fiber dispersion measurement operation, an optical fiber mode field diameter measurement operation, and an SOP event positioning and rotation speed monitoring operation based on at least one of the communications code stream or the information used to reflect the feature of the optical fiber.

14. The apparatus according to claim 12, wherein the signal processor further comprises a first filter and a second filter, wherein the analog-to-digital converter comprises a first analog-to-digital converter and a second analog-to-digital converter, and wherein:
  the first filter is configured to:
    receive the to-be-processed electrical signal that is input by the coherent receiver;
    obtain, from the to-be-processed electrical signal through filtering, a first electrical signal corresponding to the first OSC signal; and
    input the first electrical signal into the first analog-to-digital converter;
  the first analog-to-digital converter is configured to:
    convert the first electrical signal into the first digital signal; and
    input the first digital signal into the first processor;
  the second filter is configured to:
    receive the to-be-processed electrical signal that is input by the coherent receiver;
    obtain, from the to-be-processed electrical signal through filtering, a second electrical signal corresponding to the second OTDR signal; and
    input the second electrical signal into the second analog-to-digital converter; and
  the second analog-to-digital converter is configured to:
    convert the second electrical signal into the second digital signal; and
    input the second digital signal into the first processor.

* * * * *